Feb. 15, 1927.

R. E. WELLS 1,617,613

ROLLER BEARING

Filed Dec. 26, 1923

Inventor:
Reginald E. Wells,
by
his Attorney.

Patented Feb. 15, 1927.

1,617,613

UNITED STATES PATENT OFFICE.

REGINALD E. WELLS, OF EAST ORANGE, NEW JERSEY, ASSIGNOR TO GENERAL MOTORS CORPORATION, OF DETROIT, MICHIGAN, A CORPORATION OF DELAWARE.

ROLLER BEARING.

Application filed December 26, 1923. Serial No. 682,659.

This invention relates to roller bearings and is herein shown as embodied in an improved roller and cage assembly for use between cylindrical raceways.

One well known form of roller bearing in use at the present day has a cage the heads of which are provided with struck up projections or teats entering the ends of hollow rollers. These projections merely retain the rollers against loss in handling and do not act as trunnions or guide the rollers when in use, this guiding function being performed by tie-bars connecting the cage heads and lying between adjacent rollers. The connecting bars take up so much peripheral space that the number of rollers that can be used is reduced and the capacity of the bearing for load is so much lessened. The cages in such bearings are usually centered or supported by engagement with either the inner or the outer race and both types have to be supplied for different conditions of use. When a bearing roller is made of a helically coiled strip, the endmost convolutions present sharp points towards the cage heads and the ends of the roller are apt to have burrs which will cut into the cage heads unless faced off or trimmed in some way. Each end convolution and particularly the last part of the end convolution is weaker than a corresponding portion at the middle of the roller and under load it is found that this part of the coil tends to unwind or spring outwardly beyond the circumference of the roller, thus causing a bump.

An object of the invention therefore is to provide a roller and cage assembly which will avoid the above noted and other defects. In accordance with one feature, a hollow helical roller is sleeved loosely on each of a series of closely spaced tie-rods connecting end rings of a cage head, the clearance between the rods and the bores of the rollers being less than the clearances between the cage heads and the inner and the outer races, the tie-rods performing the function of uniting the end rings, guiding and retaining the rollers, and supporting the cage head in a floating manner. In accordance with another feature, the ends of the helical rollers are cut away or bevelled at their peripheries for a distance preferably an appreciable fraction of the width of a single convolution, thus taking the load off the last part of a convolution and avoiding harmful deflection of the sharp ends of the coil.

To these ends and also to improve generally on devices of this nature, the invention also resides in the various matters hereinafter described and claimed.

Referring to the drawings Figure 1 is an exploded view of the rollers and cage.

Figure 1:
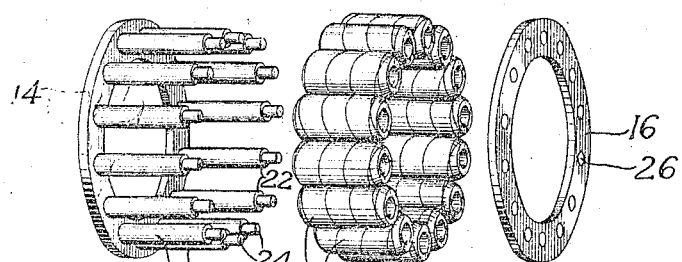

The roller and cage assembly may be marketed with or without the inner race ring 10 and the outer race ring 12 between which the rollers and cage travel. The two opposite end rings or cage heads 14 and 16 are rigidly connected by a series of closely spaced tie-bars 18 on which rollers 20 are sleeved, each roller being formed of a helically coiled strip and being of a length slightly less than the distance between the end rings. Each tie-bar is shouldered as at 22 and the resulting extensions 24 are riveted down into countersunk openings 26 in the end rings.

Figure 2:
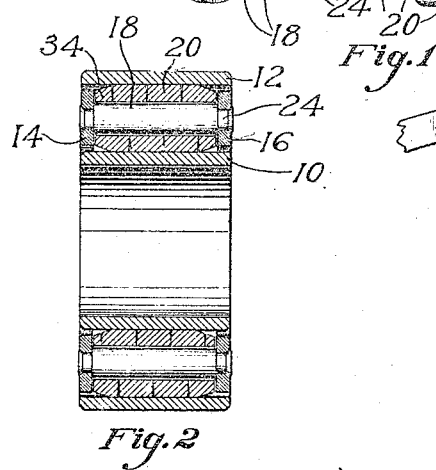
Figure 2 is a vertical section.

As shown best in Figure 2, there is a radial clearance between each tie-bar 18 and the bore of its roller, this clearance being purposely less than the clearance between the inner peripheries of the cage heads and the inner race ring 10 and also less than the clearance between the outer peripheries of the cage heads and the outer race ring 12. By this construction, no load is transmitted to the cage and the latter floats on the rollers. Inasmuch as coiled rollers are usually wound on a mandrel, the bore is truly cylindrical and, in co-operation with the cylindrical tie-bars, the rollers are accurately guided with their axes parallel to the axis of the assembled bearing. The tie-bars therefore connect the cage heads, support the cage in a floating manner, retain the rollers against loss and also guide them, by utilizing the tie-bars as guides in co-operation with the cylindrical bore of a coiled roller, more rollers can be incorporated in the bearing and the capacity is increased.

Figure 3:
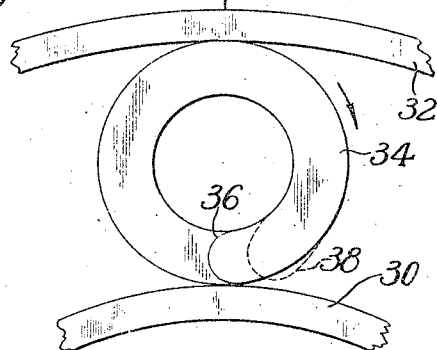
Figure 3 is an end view of a roller cut off square, illustrating somewhat diagrammatically the result of a load on such a roller.
Figure 4:
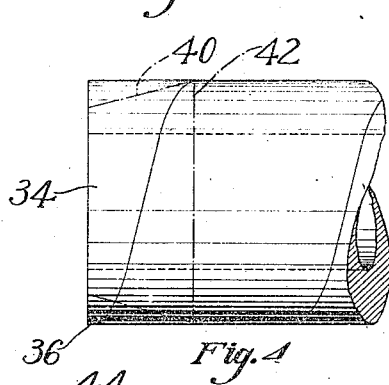
Figure 4 is a side view of such a roller.
Figure 5:
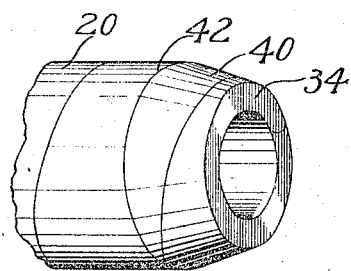
Figure 5 is a perspective view of the end of one of the improved rollers of my invention.
Figure 6:
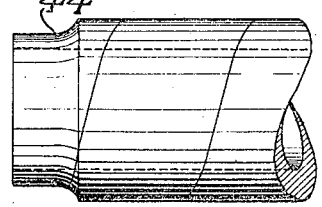
Figure 6 is a side view of a portion of a modified form of roller.

In Figures 3 and 4 there is shown a coiled roller the end faces of which are cut off square with the axis and 34 indicates the last coil or convolution which ends in a sharp edge 36. When such a roller is supported between an inner race 30 and an outer race 32 and subjected to load, the end coil or convolution, and particularly the last part of the end coil or convolution, is so much weaker than a corresponding part near the middle of the roller, that it tends to unwind or spring out as indicated at 38. Hence, in the operation of the bearing there is a series of bumps and, if there is any axial movement of the sharp edge 36 beyond the end of the roller, the edge tends to cut into the cage heads. Accordingly, an important feature of my invention consists in chamfering or beveling the ends of the rollers, as along the line 40, this cut preferably extending at least as far as the line 42, this line being at a distance from the end of the roller equal to an appreciable fraction of the width of a convolution. As will appear from Figure 5, this construction relieves the end of the coil from the load and, if there is any outward deflection at the end of the coil 34, there is no interference with the race rings. The end of the coil acts to stiffen that part of the coil which is subject to load and the long bevel also acts as a guide to facilitate slipping the cage assembly inside the race rings. Figure 6 shows a modified form of roller in which the end of the roller is cut out as at 44 instead of having its end chamfered or beveled. This also removes the load from the weakened end of the coil.

Although the invention has been described by reference to a specific embodiment it should be understood that, in its broader aspects, the invention is not necessarily limited to the precise construction selected for illustrative purposes.

I claim:

An antifriction bearing comprising radially-spaced inner and outer race-rings, a cage between said rings and having annular heads spaced from each of them, a series of guide bars extending between and fastened to said heads, and a circular series of helically-wound, centrally-hollow, load-supporting rollers between said rings and said heads and approximately contiguous to each other throughout the complete circle of said series, each said roller having one of said bars loosely received in it in guiding proximity thereto and closer to the roller than said heads are to either race-ring, whereby said bars fasten the cage-heads together, retain the rollers in the cage, guide rollers whose flexibility permits compression under load, and hold the cage-heads away from contact with the race-rings, while also relief of bar contact is permitted for rollers not under load, and the maximum number of rollers is provided in the series; substantially as described.

In testimony whereof I hereunto affix my signature.

REGINALD E. WELLS.